US009876905B2

(12) United States Patent
Isaacs (10) Patent No.: US 9,876,905 B2
(45) Date of Patent: Jan. 23, 2018

(54) SYSTEM FOR INITIATING INTERACTIVE COMMUNICATION IN RESPONSE TO AUDIO CODES

(75) Inventor: Charles H. Isaacs, San Jose, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 762 days.

(21) Appl. No.: 12/984,365

(22) Filed: Jan. 4, 2011

(65) Prior Publication Data

US 2012/0075083 A1    Mar. 29, 2012

Related U.S. Application Data

(63) Continuation-in-part of application No. 12/893,316, filed on Sep. 29, 2010, and a continuation-in-part of application No. 12/894,483, filed on Sep. 30, 2010.

(51) Int. Cl.
*G06Q 30/00* (2012.01)
*H04M 3/42* (2006.01)
*H04M 3/493* (2006.01)
*G06Q 30/02* (2012.01)

(52) U.S. Cl.
CPC .... *H04M 3/42382* (2013.01); *G06Q 30/0241* (2013.01); *H04M 3/493* (2013.01); *H04M 2201/18* (2013.01); *H04M 2201/50* (2013.01); *H04M 2203/355* (2013.01); *H04M 2203/357* (2013.01); *H04M 2203/652* (2013.01)

(58) Field of Classification Search
USPC ........... 705/14.64, 27; 340/13.2; 700/94; 382/100; 713/176; 704/500, 270; 715/64
See application file for complete search history.

(56) References Cited

U.S. PATENT DOCUMENTS 5,276,909 A * 1/1994 Milner et al. ............... 340/7.49
5,995,553 A * 11/1999 Crandall et al. ............ 375/272
6,076,733 A   6/2000 Wilz, Sr. et al.
(Continued)

FOREIGN PATENT DOCUMENTS

CA      2805484 A1    1/2012
WO  2007 070188 A2   6/2007
(Continued)

OTHER PUBLICATIONS

Anonymous, "QR code," Wikipedia, Jul. 11, 2010, XP000002656991, Retrieved from the Internet: URL:https://secure.wikimedia.org/wikipedia/en/w/index.php?title=QR_code&oldid=372933104 on Oct. 22, 2012, pp. 1-2.
(Continued)

*Primary Examiner* — Luis A Brown
(74) *Attorney, Agent, or Firm* — Lewis Roca Rothgerber Christie LLP (57) ABSTRACT

A communication appliance has a processor, a data store, a display screen, an interface to a wireless network, a microphone, and software executable from a machine-readable physical medium, wherein the software provides a function for comparing incoming audio signals with signals stored in the data store as trigger signals, and a function for initiating an action or sequence of actions in response to recognizing an incoming signal as a trigger signal.

16 Claims, 5 Drawing Sheets

(56) References Cited

U.S. PATENT DOCUMENTS

| | | |
|---|---|---|
| 6,102,289 A | 8/2000 | Gabrielson |
| 6,151,611 A | 11/2000 | Siegel |
| 6,493,447 B1 | 12/2002 | Goss et al. |
| 6,625,313 B1 | 9/2003 | Morita et al. |
| 6,961,712 B1 | 11/2005 | Perkowski |
| 6,990,453 B2 | 1/2006 | Wang et al. |
| 7,003,731 B1* | 2/2006 | Rhoads et al. ............... 715/768 |
| 7,343,330 B1 | 3/2008 | Boesjes et al. |
| 7,346,512 B2 | 3/2008 | Wang et al. |
| 7,359,889 B2 | 4/2008 | Wang et al. |
| 7,627,477 B2 | 12/2009 | Wang et al. |
| 7,739,062 B2 | 6/2010 | Wang |
| 7,797,204 B2 | 9/2010 | Balent |
| 7,853,664 B1 | 12/2010 | Wang et al. |
| 7,865,368 B2 | 1/2011 | Wang et al. |
| 7,881,657 B2 | 2/2011 | Wang et al. |
| 7,904,333 B1 | 3/2011 | Perkowski |
| 7,986,913 B2 | 7/2011 | Wang |
| 8,086,171 B2 | 12/2011 | Wang et al. |
| 8,090,579 B2 | 1/2012 | DeBusk et al. |
| 9,460,465 B2 | 10/2016 | Isaacs |
| 2001/0045461 A1 | 11/2001 | Schuessler |
| 2002/0009208 A1 | 1/2002 | Alattar et al. |
| 2003/0106039 A1 | 6/2003 | Rosnow et al. |
| 2003/0110516 A1* | 6/2003 | Chang et al. ............... 725/136 |
| 2004/0148226 A1 | 7/2004 | Shanahan |
| 2004/0267879 A1 | 12/2004 | Smith et al. |
| 2005/0008130 A1 | 1/2005 | Wakamatsu |
| 2005/0197893 A1 | 9/2005 | Landau et al. |
| 2005/0228849 A1 | 10/2005 | Zhang |
| 2005/0246422 A1 | 11/2005 | Laning |
| 2006/0065733 A1 | 3/2006 | Lee et al. |
| 2006/0070006 A1 | 3/2006 | Erol et al. |
| 2006/0095860 A1 | 5/2006 | Wada et al. |
| 2006/0167940 A1 | 7/2006 | Colton et al. |
| 2007/0198359 A1 | 8/2007 | Kannan et al. |
| 2007/0205596 A1 | 9/2007 | Mizuno et al. |
| 2008/0142599 A1 | 6/2008 | Benillouche et al. |
| 2008/0191878 A1 | 8/2008 | Abraham |
| 2008/0270884 A1 | 10/2008 | Rehm |
| 2009/0132391 A1* | 5/2009 | Jacobs ............... 705/27 |
| 2009/0307232 A1 | 12/2009 | Hall |
| 2010/0036384 A1* | 2/2010 | Gorek et al. ............... 606/104 |
| 2010/0036984 A1 | 2/2010 | Goodman et al. |
| 2010/0121681 A1 | 5/2010 | Abdulhayoglu et al. |
| 2010/0133333 A1 | 6/2010 | Rathus |
| 2010/0134278 A1* | 6/2010 | Srinivasan et al. ...... 340/539.13 |
| 2010/0158311 A1* | 6/2010 | Takahashi et al. ........... 382/100 |
| 2010/0211448 A1 | 8/2010 | Beenau et al. |
| 2010/0223664 A1 | 9/2010 | Naranjo et al. |
| 2010/0228963 A1 | 9/2010 | Kassab et al. |
| 2010/0274910 A1 | 10/2010 | Ghanaie-Sichanie et al. |
| 2010/0281398 A1 | 11/2010 | Melideo |
| 2011/0040610 A1 | 2/2011 | Araiza-Boys |
| 2011/0145064 A1 | 6/2011 | Anderson et al. |
| 2011/0246202 A1* | 10/2011 | McMillan et al. ............ 704/270 |
| 2011/0320277 A1 | 12/2011 | Isaacs |
| 2012/0011218 A1 | 1/2012 | Isaacs |
| 2012/0075083 A1 | 3/2012 | Isaacs |
| 2013/0071037 A1 | 3/2013 | Isaacs |
| 2017/0017819 A1 | 1/2017 | Isaacs |

FOREIGN PATENT DOCUMENTS

| | | |
|---|---|---|
| WO | 2011163047 A1 | 12/2011 |
| WO | 2012009182 A1 | 1/2012 |

OTHER PUBLICATIONS

Australian Office action for Application No. 2011279474, dated Nov. 15, 2013, 3 pages.
International Preliminary Report on Patentability and Written Opinion for PCT/US2011/040628, dated Dec. 28, 2012, 5 pages.
International Search Report for PCT/US2011/040628, dated Sep. 1, 2011, 2 pages.
International Search Report for PCT/US2011/042989, dated Sep. 16, 2011, 4 pages.
Dell Contact Customer Service Support Home Page, http://web.archive.org/web/20090320044639/http://support.dell.com/support—from www.dell.com Website Nov. 28, 2012, 1 page.
Australian Government Patent Examination Report No. 1 for Application No. 2015213415, dated Aug. 30, 2016, 3 pages.
Canadian Intellectual Property Office Action for Application No. 2,805,484, dated Apr. 5, 2017, 4 pages.

* cited by examiner

| Mapping Table | C | C# | D | Eb | E | F | F# |
|---|---|---|---|---|---|---|---|
| Octave 3 Frequency | 130.8 | 138.6 | 146.8 | 155.6 | 164.8 | 174.6 | 185 |
| Ascii Code Mapping (Octal) | 101 | 102 | 103 | 104 | 105 | 106 | 107 |
| Alphanurmeric Equivalent | A | B | C | D | E | F | G |

SYSTEM FOR INITIATING INTERACTIVE COMMUNICATION IN RESPONSE TO AUDIO CODES

CROSS-REFERENCE TO RELATED DOCUMENTS

The present application is a continuation-in-part (CIP) of co-pending U.S. application Ser. No. 12/893,316 filed Sep. 29, 2010, and also a CIP of co-pending application Ser. No. 12/894,483 filed Sep. 30, 2010. The disclosure of the parent applications is incorporated herein at least by reference.

BACKGROUND OF THE INVENTION

1. Field of the Invention

The present invention is in the field of electronic commerce and pertains particularly to methods and apparatus for initiating interactive communication through a system that utilizes tone sequences to communicate code to or cause generation of code on digital computing appliances.

2. Discussion of the State of the Art

In the field of electronic commerce, much development and advancement has been made relative to reaching potential consumers through common channels in order to make doing business over a network more efficient and less task intensive. In many advertising campaigns proactive contact with potential consumers is made through traditional media such as email, web-based banner advertising, billboard and print ads, and telephony.

The inventors are aware of a system for enabling immediate conveyance of real-time information from a contact center servicing a business. This system is described in unpublished application Ser. No. 12/893,316 listed above in the Cross-Reference to Related Documents, and is not prior art. That system utilizes an application program interface (API) implemented in software (SW) on a digital medium executable from the digital medium to be embedded into the business's customer website. An option launch container implemented in SW executable from the digital medium associated with the website for displaying and for providing direct access to service options through the container. The container automatically downloads and temporarily or permanently installs in the toolbar area of a visitor's browser application or as a pop-up window while that visitor is visiting the Website of the business entity.

The inventors are aware of another system for retrieving information over a network. This system is described in unpublished application Ser. No. 12/894,483 filed Sep. 30, 2010, listed in the Cross-Reference to Related Documents above, and is also not prior art. In this system a machine-readable code is implemented in a visible fashion on a product or product representation such as a visible advertisement. Additionally, a set of machine instructions is implemented as a software application resident on and executable from the digital medium of a mobile network appliance. In this system the user operating the mobile appliance aided by the application acquires the machine readable code associated with the product or product representation such as by scanning, whereupon the machine readable code is interpreted by the application to identify, retrieve and display one or more interactive menu options relative to the product or product representation on the mobile appliance. The interactive menu options displayed may be interacted with to cause navigation to and or connection with an information source on the network adapted to service inquiries and requests relative to the product code scanned.

It has occurred to the inventor that while the above-mentioned systems provide interactive access to service options to potential consumers in a more efficient manner than can be provided through traditional media, more innovation is required to broaden the avenues through which the potential consumer can receive such proactive information.

Therefore, what is clearly needed is a system for communicating that allows potential consumers to receive or otherwise capture tone sequences proceeding from a device or system enabled for audio output that, when received and analyzed on the consumer's appliance, cause automatic initiation of interaction between the consumer and the source or a third party representing the source of the tone sequences.

SUMMARY OF THE INVENTION

The problem stated above is that more efficient interaction between potential clients and systems marketing to those clients is desirable but many of the conventional means for creating or initiating interaction such as by proactive contact through digital media, such as by email, also introduces latency and extra work on the part of the potential client. The inventors therefore considered functional components of a mass marketing or advertising system, looking for elements that exhibit interoperability that could potentially be harnessed to provide initiation of interaction between potential clients and a commercial system but in a manner that would not create latency or add extra task work for the potential clients.

Every advertising campaign or marketing system is propelled by client response, one by-product of which is an abundance of clients willing and ready to interact with the advertising or marketing program. Most advertising and marketing campaigns employ digital media including audio and visual advertising from disparate sources to reach potential clients, and the World Wide Web (WWW), radio, television, and telephony networks and apparatus are typically part of such apparatus.

The present inventor realized in an inventive moment that if, at the point of contact with a potential client, audio signals that represent code could be efficiently communicated to the potential client's communication appliance where such code causes the device to perform an action such as automatically retrieving and displaying interactive menu to open up a communications channel, significant reduction in latency and work associated with traditional interaction between two parties might result. The inventor therefore provided a unique communication appliance and method for communicating that allowed potential clients to receive or otherwise capture tone sequences emanated from a device or system enabled for audio output that, when received, cause automatic initiation of interaction between the potential client and the source or a third party represented by the source of the tone sequences. A significant reduction in latency between initial contact and completion of business results, with less work involved on the part of the potential client.

Accordingly, in one embodiment of the present invention, a communication appliance is provided comprising a processor, a data store, a display screen, an interface to a wireless network, a microphone, and software executable from a machine-readable physical medium, wherein the software provides a function for comparing incoming audio signals with signals stored in the data store as trigger signals, and a function for initiating an action or sequence of actions in response to recognizing an incoming signal as a trigger signal.

In one embodiment, the incoming audio signals source from a Website, a radio, a television, a tone emitter, or another digital appliance capable of audio output. In one embodiment, the action or sequence of actions is to navigate to a server and download a menu. In another embodiment, the action or sequence of actions in response to recognizing an incoming signal as a trigger signal is to listen for a subsequent set of audio signals causing one or more further actions to be initiated.

In one embodiment, the audio signals are inaudible to humans either outside of the high end or low end of the human range of hearing. In one embodiment, the audio signals are received through the microphone. In another embodiment, the audio signals are received through the network interface. In one embodiment, the audio signals are embedded into an audio or audio/video advertisement, a music selection, a video presentation, a television program or a radio program consumed by the appliance.

In one embodiment of the invention, the software provides a further function for converting audio signals to unified product code (UPC). In another embodiment, the communication appliance further includes a frequency-to-ASCII code conversion table for converting audio signals to ASCII code usable for initiating an action or sequence of actions including generating a specific menu on the appliance.

According to one aspect of the present invention, a method is provided for initiating one or more actions from a communication appliance in response to incoming audio signals comprising the steps, (a) receiving one or more audio signals, (b) comparing the received audio signal or signals to one or more signals stored as trigger signals in a data store, and (c) upon recognizing the one or more audio signals as a trigger signal, initiating an action or sequence of actions on the appliance.

In one aspect of the method, in step (a), the incoming audio signals source from a Website, a radio, a television, a tone emitter, or another digital appliance capable of audio output. In one aspect, in step (a), the audio signals are received through a microphone or through a network interface on the appliance. In one aspect, in step (a), the audio signals are inaudible to humans either outside of the high end or low end of the human range of hearing.

In one aspect, in step (a), the audio signals are embedded into an audio or audio/video advertisement, a music selection, a video presentation, a television program or a radio program consumed by the appliance. In one aspect, in step (a), receiving one or more audio signals is manually triggered by a user operating the communication appliance as a result of a visual or audio stimulus. In one aspect, in step (b), the data store is onboard the appliance or accessible to the appliance over a network.

In one aspect of the method, in step (c), the action or sequence of actions is to navigate to a server and download a menu. In another aspect, in step (c), the action or sequence of actions is to listen for a subsequent set of audio signals causing one or more further actions to be initiated on the appliance. In one aspect of the method in step (c), the action or sequence of actions is assembling a menu on the device and opening a communications channel through the menu to an appropriate third party.

DETAILED DESCRIPTION

The inventors provide a system for communication that allows an application on a receiving computing appliance to capture and interpret audio frequencies or tones as code that is executable to perform an action on the receiving appliance. The present invention is described in enabling detail using the following examples, which may describe more than one relevant embodiment falling within the scope of the present invention.

Figure 1:
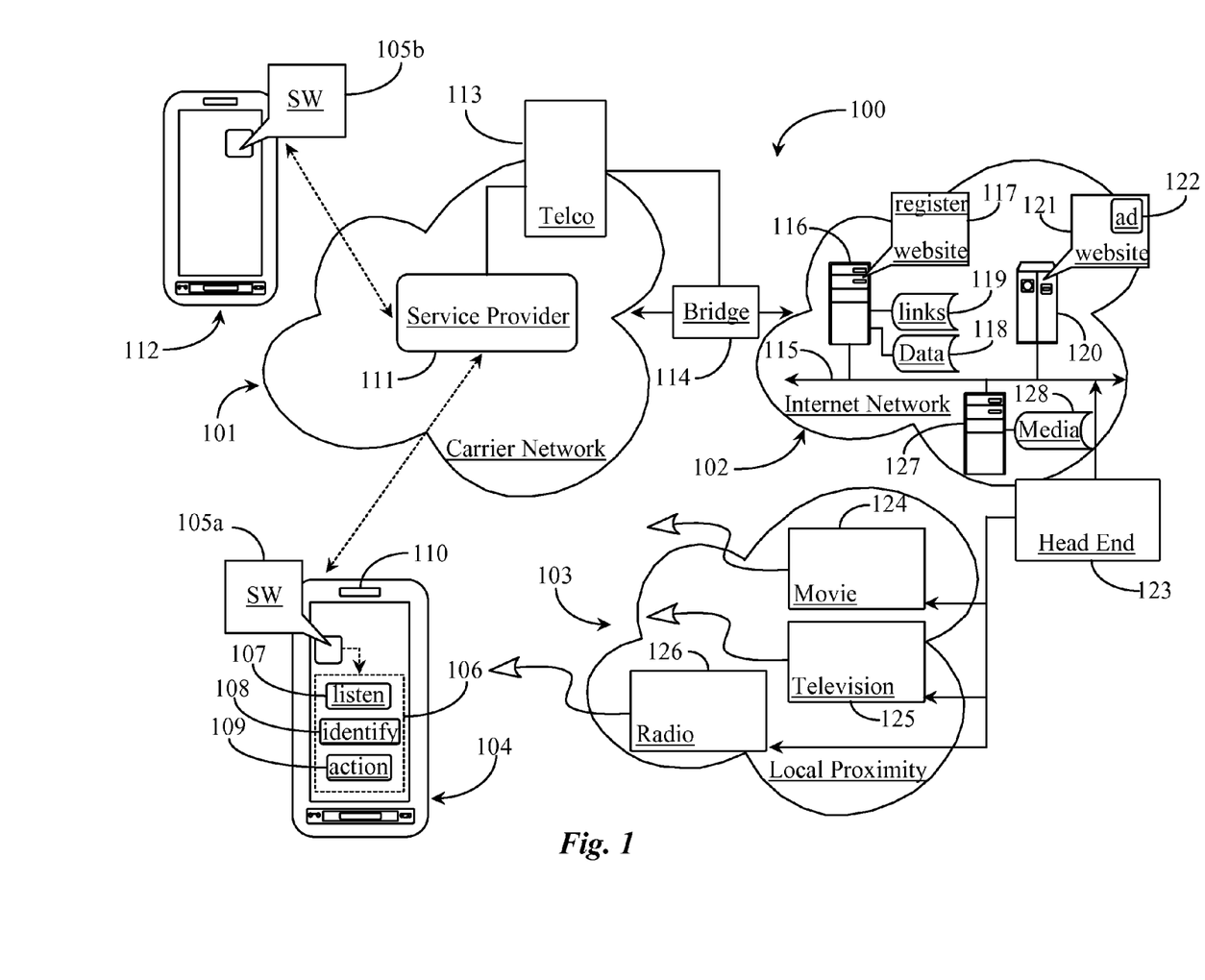
FIG. 1 is an architectural overview of a communications network supporting initiation of communication in response to audio code according to an embodiment of the present invention.

FIG. 1 is an architectural overview of a communications network 100 supporting initiation of communication in response to audio code according to an embodiment of the present invention. Communications network 100 includes a digital wireless carrier network 101. Carrier network 101 may be a digital cellular network or a wireless digital network that can support telephony and connection to a wider network such as the Internet network. The Internet network is illustrated in this example as network 102. Internet network 102 is also represented by an Internet backbone 115, which represents all of the lines, equipment, and access points that make up the Internet network as a whole. Therefore, there are no geographic limitations on the practice of the present invention.

Internet network 102 may be a corporate wide area network or a municipal area network without departing from the spirit and scope of the present invention. The inventors choose the Internet network in this example because of its high public access characteristic. Carrier network 101 and Internet network 102 are bridged for cross communication via a network bridge or gateway 114. Carrier network 101 includes a service provider 111, which may provide both telephony communications services and access to Internet 102 for subscribed users.

A first user is illustrated in this embodiment as a digital appliance in the form of a $3^{rd}$ or $4^{th}$ generation smart phone 104. Smart phone 104 may be assumed to include a digital medium that is adapted to contain all of the data and software required to enable function as a smart phone. Digital appliance 104 is enabled for telephone communications and network navigation via an operating system and a network browser application (not illustrated). In this example, appliance 104 is a smart phone, in another embodiment appliance 104 may be an iPad, an Android, or some other personal digital assistant (PDA). Appliance 104 includes a speaker system and a microphone 110.

A second user is similarly illustrated in this embodiment as a digital appliance in the form of a $3^{rd}$ or $4^{th}$ generation smart phone 112. The description of features and capabilities ascribed to appliance 104 also apply is same or similar manner to digital appliance 112. Digital appliance 104 and digital appliance 112 are illustrated as having active connection to service provider 111 for active telephony and Internet-based services.

A telephone carrier or telephone company (Telco) 113 is illustrated in this example and has connection to service provider 111 and to network bridge 114. Service provider 111 may be a separate entity from Telco 113 or they may be part of the same entity. Internet 102 includes a web server 116 connected to Internet backbone 115. Web server 116 includes a digital medium provided thereon or accessible thereto that is adapted to contain all of the data and software to enable function as a web server. Web server 116 hosts a registration website 117.

Registration website 117 may be provided by a third party company that may provide registration services for frequency sequences created by companies offering products and services to their consumer base. In one embodiment, companies may provide their own registration and management services to their own customer bases so web server 116 is not specifically required in order to practice the present invention. It merely provides a unified interface to consumers who may wish to interact with a variety of products and services offered by various companies.

Web server 116 may be hosted by a company that manages links and data for clients that include companies who wish to register their specific audio codes or frequencies that they may include in proactive advertisements and marketing campaigns to potential consumers such as user 104 and user 112. In one embodiment consumers may register at website 117 and have their digital appliances enabled by software to recognize audio sequences and interpret or generate executable code as a result of capturing and identifying tone sequences, for example, that various client companies have registered with the website.

One existing service that may be incorporated as a platform for practicing the invention in at least one embodiment is Alluc.org. Alluc.org is a link sharing website that catalogues links to TV shows, movies, music videos, sport, anime and cartoons to make them more easily accessible. Alluc.org does not host any content itself. Alluc.org also does not contain any download links, all are links to streaming video sharing websites. Users provide the links in the right category and they are released to the site after having been checked by the administrators. Video hosting sites that are linked to Alluc.org include YouTube™, DailyMotion™ and Veoh™, amongst others.

Web server 116 has access to a repository 119 labeled links. Repository 119 is adapted to contain all of the universal resource locators (URLs) to interactive menus or other interactive data provided by business clients that may include enterprises, small businesses, and individuals. Consumers operating digital appliances like smart phone 104 as a result of executing generated or interpreted code derived from one or more tone sequences received at specified frequencies may access such links to download the information.

Web server 116 also includes connection to a repository 118 labeled data. Data repository 118 is adapted to contain all of the data associated with client registration and billing, as well as any data that might be pertinent to aiding consumers to discover the correct URL information when interpreted or generated code is executed on the receiving digital appliances. To this end, a digital appliance such as appliance 104, for example, has a software application 105a provided thereon and adapted to recognize and interpret the tone sequences that are registered at website 117. In this example, application 105a is also illustrated as opened in the form of open application 106. Open application 106 has a minimum number of functional components including a manually selectable network and ambient listening function 107, an automatic tone sequence identification or reading function 108, and a resulting action function 109 for performing an action on the appliance.

Application 105a running on digital appliance 104 may be manually invoked by a user that intends to "listen" for any transmitted tone sequences that the user's appliance may be exposed to in premeditative fashion such as by target advertising or by circumstance such as with passive consumption of generated media like web-based media or broadcast television, a movie, or a radio program. Digital appliance 112 includes an application 105b. Application 105b may include the functions of application 105a and in addition, a function for creating tone sequences that can be embedded in an audio stream or that can be emitted as standalone audio tone sequences.

Network backbone 115 supports a web server 120. Web server 116 includes a digital medium provided thereon or accessible thereto that is adapted to contain all of the data and software to enable function as a web server. Web server 120 hosts a website 121. Website 121 represents any website managed for a company that has registered tone sequences with third-party website 117. Website 121 includes a dynamic or static, but interactive advertisement 122. Advertisement 122 represents a possible source for emanating one or more tone sequences upon interaction with the ad such as by clicking on an icon that may indicate that the advertisement is enabled to emit audio tones that may be detected relative to frequency of those tones in sequence by digital appliance 104 running application 105a, for example.

Advertisement 122 may be an audio or audio/video advertisement. A user such as one operating digital appliance 104 may visit website 121 through normal Internet service provision and click on or otherwise invoke advertisement 122. With application 105a in the invoked state 106, the user may manually select the function listen 107 causing the application to monitor the audio of advertisement 122 as it is received over the established connection for a sequence of tones that may be a forerunner to a second sequence of tones that may emulate or represent a code that becomes executable on the handheld appliance. In one embodiment, a first sequence of tones may be identified automatically by function 108 of application 105a as an alert sequence or header tone.

The header tone may comprise one or more specific frequencies that are recognized on appliance 104 by virtue of a library of "header tone sequences" belonging to different companies that may be stored on the permanent or removable memory of the digital appliance when application 105a is downloaded from website 117, for example. Function 107 continues after the header tone is recognized in listening for a code tone sequence.

A consumer registering to receive and interpret tone sequences may, in one embodiment and as part of the registration process for consumers, select from a number of product and service providers who have their own proprietary tone sequences registered with the website. In such an embodiment, the third-party service may be the service provider and may register both companies and consumers to participate. A user operating digital appliance 104 may listen for and receive and recognize a "header tone sequence" and then may listen for, receive and recognize a "code tone sequence".

The code tone sequence may include code emulation through frequency identification such that the actual code is derived from the particular sequence of frequencies. It is noted herein that the tones or frequencies may be outside of the range of human hearing yet can still be detected by the receiving appliance. In this way tone sequences may be embedded in streaming audio and may be picked up and interpreted without diminishing the quality of the audio playing for the consumer.

Application 105a has an action function 109 that come into play when a code tone sequence is deciphered for the code that initiates the "action". Therefore, action function 109 may vary as to the type of action and is a direct and automatic result of interpreting or assembling and executing the resulting code received at the digital appliance through the tone sequence. An action may be to navigate to a URL and download an options menu that is related to the product or service represented by the tone code sequence. In one embodiment, code tone sequence is interpreted with the aid of a forged connection to a third-party server that contains all of the code tone sequences for a particular header tone proprietary to a company. In such an embodiment, the user may receive and recognize the header tone sequence, which triggers automatic connection to the third-party server.

Once connected to the third-party server, the code tone sequence can be matched to code tone sequences stored at the server under the recognized header or alert tone sequence for a company or service provider. Once the tone sequence is matched at the server the functional code may be retrieved from the server and executed at the appliance to perform an action, such as navigate to an order site, retrieve a menu or toolbar of current contact options for the user to pursue more information or to order a product or service represented.

Internet backbone 115 supports a multimedia server 127. Multimedia server 127 includes a digital medium provided thereon or accessible thereto that is adapted to store all of the data and software necessary to enable function as a multimedia server. Multimedia server 127 might be a video server, an advertisement server, a pod cast or web cast server, or a messaging server enabled for serving messages embedded with audio or audio/video messages or advertisements. Multimedia server 127 is connected to a data repository 128 adapted to contain the type pf media served to or downloaded by users.

In one embodiment, communications network 100 includes a head end source 123 for movies 124, television 125, or radio 126 illustrated in a cloud 103 labeled local proximity, meaning that the available sources of audio, movies 124, television 125, or radio 126 are within ambient listening range of digital appliances 104. For example, a user operating digital appliance 104 may open application 105a and select "listen" 107 while watching television 125, while watching a movie 124, or while listening to radio 126. The listen function may be invoked by the user when the user becomes interested in certain content of the media such as a commercial or a specific portion or point in a program. The appliance will then listen for a tone code sequence, which when interpreted will cause the resulting action to occur on the hand-held appliance, like navigating to a server-hosted website to download a contact menu, which may be presence enabled to report current availability of agents and so on.

The actual information retrieved will depend in part on the nature of the company advertising using the tone code. For example, if the tone sequence is embedded in a special music program the user is listening to, the digital appliance, set to listen during the program, might receive tickets to a concert or a discount coupon for an album upon interpreting a received code tone sequence. If the tone code sequence can be converted to a code like ASCII using onboard rules, the resulting executable code can be used to generate (on the appliance) a menu or coupon or some usable key that can be traded for something or that can be used to access something online. In one aspect, SW 105a may recognize a certain audio signature and could compare the signature to pre-stored signatures to instantiate functionality. The functionality can defined as access to or download of a menu or toolbar that has interactive and updated or refreshable choices for accessing a web site or calling a call center associated with the artist, a sales enterprise, and so on.

In one embodiment the system may emulate Morse code by regulating difference in length of tones (long or short) and frequency as well, and in other ways. For example, every code sequence might start with a header tone to indicate the start of a code tone. The header tone could be emitted as a sequence of notes arranged in short and long durations. A C note might be the first note at 261 hz followed by an E note at 329 hz or the dots of the code could all be at 261 hz while the dashes are all at 329 hz. As soon as the "header" tone is discerned by the handheld appliance, it triggers the parser that converts the frequencies and durations of the next tones into the "UPC" code, menu code, compiler code, or the like. There may, in one aspect, be an ending tone sequence such as an end of message (EOM) tone or tone sequence. In one embodiment as soon as enough data is stored for a code the code listening module may trigger the event that brings the menu to the handheld appliance, or takes the appropriate action on the handheld appliance.

In one aspect of the invention, SW 105b can be used to generate a tone code sequence and send that sequence to another digital appliance like appliance 104 running SW 105a. This transaction scenario may be used to initiate payment of funds from one party to another through interpretation of the code at the receiving appliance. A version of altered form of SW 105b may be used in electronic packages, cards, and other products sold in retail outlets. For example, a shopper might open a card on a pair of jeans that plays a jingle followed by a tone code sequence that provides connection to a live or recorded manufacturing information source that provides more information about the pair of jeans. The ability to transmit something to the potential buyer's handheld appliance may increase the likelihood of some repeat business.

Figure 2:
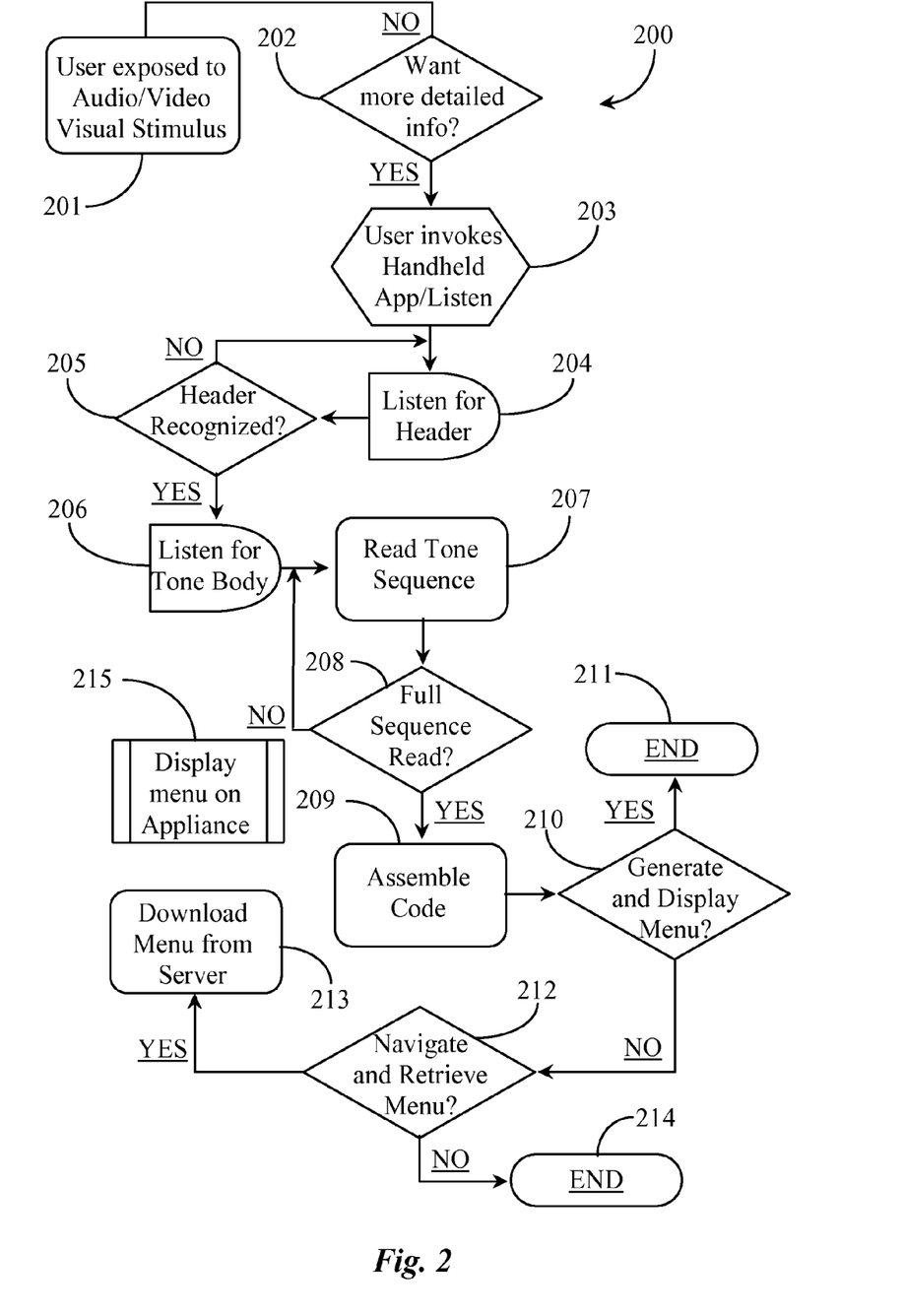
FIG. 2 is a process flow chart illustrating steps for receiving and interpreting or generating audio code for initiating communication.

FIG. 2 is a process flow-chart 200 illustrating steps for receiving and interpreting or generating audio code for initiating communication. One aspect of the present invention assumes that the user is operating a handheld appliance that is enabled by SW to practice the invention. The SW may reside on a permanent digital medium or on a removable digital medium plug able into the handheld appliance. In one aspect the SW may reside on a digital medium accessible to a third-party server and may be implemented as a temporary download that is active only when a connection to the server is maintained.

At step 201, the user operating the handheld appliance is exposed to audio/video (audio and or audio with video) or some visual stimulus such as an icon flashing in media or on a product chip or electronic emitter that indicates that a tone code sequence is available. The audio/video may be ambient audio/video such as from a television, a movie in a theater, or from a like source. If audio only, a radio or electronically recoded audio clip or message may be the source. A wide variety of scenarios could apply from point of sale scenarios to electronic ecommerce scenarios where the user is pre-connected to a network.

At step 202, the user may determine whether or not more information is desired about the instant opportunity. In one embodiment, there may be myriad opportunities offering interaction between the user and a source for more information such as in a retail environment where individual products are enabled to emit tones or multiple selections are present for tone emitting audio like a list of music selections oat a music site for example. If the user is interested in learning more, at step 202, about the pending transactional opportunity, then the user may invoke the application installed on the handheld appliance if it is not already open and set the application to "listen".

If the tone source includes a header tone, the header tone and subsequent tone code sequence (body) might be repeated periodically to accommodate a user who invokes listen in the application after the tone sequencing as already started. In this way the header tone may be captured and recognized in its entirety. If at step 202 the user is not interested or does not want to know more about a product or advertisement being promoted then the process may resolve back to step 201 until the user becomes interested in getting some more information about the advertised product or service.

Referring now back to step 203, upon setting the application to listen, the application monitor begins listening for, in this example, a header tone or tone sequence at step 204. The header tone sequences may differ between advertising entities or companies. For example, a company like Intel may use its proprietary jingle termed Intel Inside. Each company may register its own proprietary header code. The handheld appliance may recognize the tone by virtue of a header tone library that may be downloaded to the handheld appliance when the application enabling the handheld appliance to practice the invention is downloaded.

At step 205 the application running on the handheld appliance determines if it has recognized a header tone or tone sequence. If at step 205, no header tone is recognized, the process might simply loop back until a header tone is recognized. In one aspect, a user might be listening for a header tone that is not recognizable to the appliance because the appliance does not have it in its header tone library. In such a case, the SW might prompt the user if they want to go online to retrieve the header tone and ad it to the existing library. In one aspect, complete header tone libraries are available on special removable media or memory cards. In another aspect, the SW may check received header tones against an online source library of header tones.

If the header tone is recognized at step 205 then the system immediately begins listening for the tone code body or sequence of tone codes at step 206. Assuming that the handheld appliance receives those immediately after the header tone, a parser is launched and reads the tone code sequence at step 207. The tone code sequence may include a tone size property that tells the parser when the entire sequence has been received. For example, if there are 5 tones in the sequence, the tone size may simply be a value of 5. At step 208, the application determines if it has read the entire sequence. If not the process loops back to step 207 until all of the tones are received and interpreted. In one aspect the SW is able to determine if there is enough data stored for an executable code because the code itself may be self-executable once it is completely stored.

If the full tone sequence is read at step 208, then the SW application may assemble the code at step 209 via a code compiler or code interpreter. The next few steps in the process may vary according to design. For example, at step 210 the application may determine whether or not to generate and display a menu, a coupon, or some other resident information as a result of assembling and executing the code at step 209. If the system is enabled for onboard code generation, execution, and resulting display of a menu, coupon, or some other information, the information will be displayed and the process will end for that sequence at step 211.

It may be that the code, once assembled, is a self-executing universal resource locator (URL). Therefore, the process may resolve to a decision at step 212 as to whether the user will navigate to an online server and download a menu, coupon, or some other information. It is noted herein that the code is not limited to enabling network navigation from the handheld appliance. It may be a telephone number that simply connects the user to an interactive voice response (IVR) unit maintained by a contact center where further interaction is by telephone. A user may have control over whether the handheld appliance will connect online to receive or download any information once the code is assembled at step 209. If the user decides not to navigate to retrieve a menu or other data at step 212, the process may end for that code sequence at step 214.

If the user determines to navigate to a URL to retrieve a menu or other information at step 212, then the process may move to step 213 where the menu or other data is downloaded from the server. Once the menu or other data is downloaded to the handheld appliance, it can be displayed on the handheld appliance for user interaction at step 215. The level of automation in process 200 may vary without departing from the spirit and scope of the present invention. For example, step 210 and step 212 may be automatic results of code assembly or interpretation on the appliance as opposed to a decision step.

Figure 3:
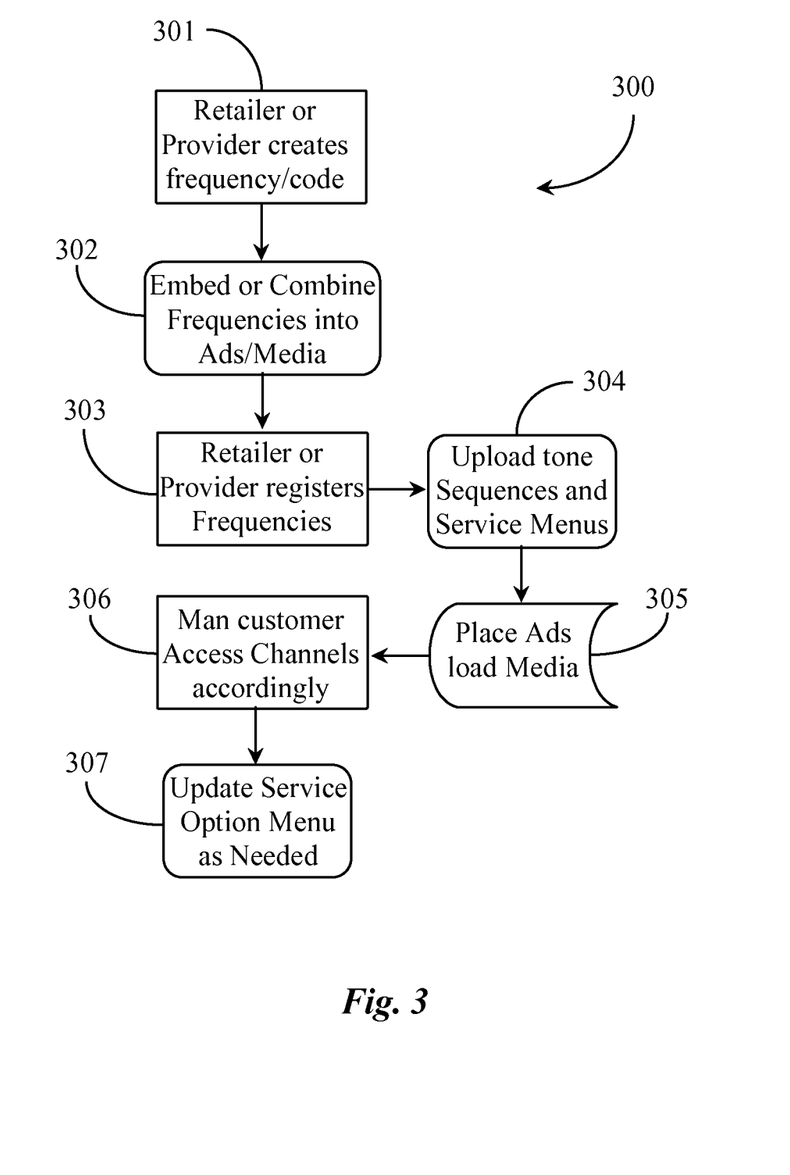
FIG. 3 is a process flow chart illustrating steps for creating and registering audio code for a proactive campaign.

FIG. 3 is a process flow-chart 300 illustrating steps for creating and registering audio code for a proactive campaign. In one aspect, a third-party website manages code registration and access to information for a fee. In this aspect, a company would register its header and tone code sequences that point to more information or otherwise provide further interaction for the user. The service might also enable subscription to users. In another case users are not required to subscribe to any services, rather the SW is automatically downloaded and installed on the handheld appliance if the user visits an enabled shopping site on the web, for example. In the retail embodiment, the user may be prompted to go online to the third-party service to download the SW application enabling them to practice the present invention prior to being exposed to any stimulus.

At step 301, the retailer, advertiser, or simply, the provider may create their tone frequencies and code. The provider may create a header tone that is unique to that provider and is proprietary to that provider. The same header tone for that provider might precede any subsequent frequency-based code the provider creates for different products and services.

At step 302, the service hosted by a third party might enable the provider of the code to embed the code into media such as audio, audio/video, or into an audio advertisement. In another embodiment the service does not provide facilities for creating ads or other media. At step 302 the provide embeds/combines the tone code frequencies into their ads or media that the potential consumers will be exposed to. At step 303, the retailer, advertiser, or provider may register its header tone frequency and, possibly its tone code frequencies in sequence. If tone code frequencies are executed to cause navigation to a specific URL to obtain information proprietary to the retailer, advertiser, or provider, then such sequences might be unique to that retailer, advertiser, or provider and be subject to registration. If URLs can be generated at appliance level from the tone frequency assembled or interpreted, then only the header tones need be registered. A company may have more than one header tone registered, such tones pointing to categories of products or services. The complexity may depend upon the variety of products and services a company wishes to advertise.

At step 304, the retailer, advertiser, or provider may upload tone sequences and service menus. A service menu may contain further links to resources and real-time contact information for calling service agents, help lines, or other resources. At step 305, the retailer, advertiser, or provider may place ads in local media. Other options also exist like placing audio code sequences in audio that is attached to physical products on store shelves, television and radio ads, or advertisements that are delivered through a messaging protocol like email or multimedia messaging service (MMS). Once the advertising is in place, the retailer, advertiser, or provider may man customer access channels accordingly at step 306 to service any requests that come in from the campaign. At step 307, the retailer, advertiser, or provider may update service menu options as needed.

In one embodiment the options are presence enabled such that while a user downloads and displays the contact options menu from the company, the server may maintain a connection to the contact center managing the campaign so that all of the most recent contact options and estimated waiting time if any for response is accurately reported. In one aspect of the invention, tone code frequencies are mapped to ASCII code and, if desired alphanumeric equivalents of the ASCII codes.

Figure 4:
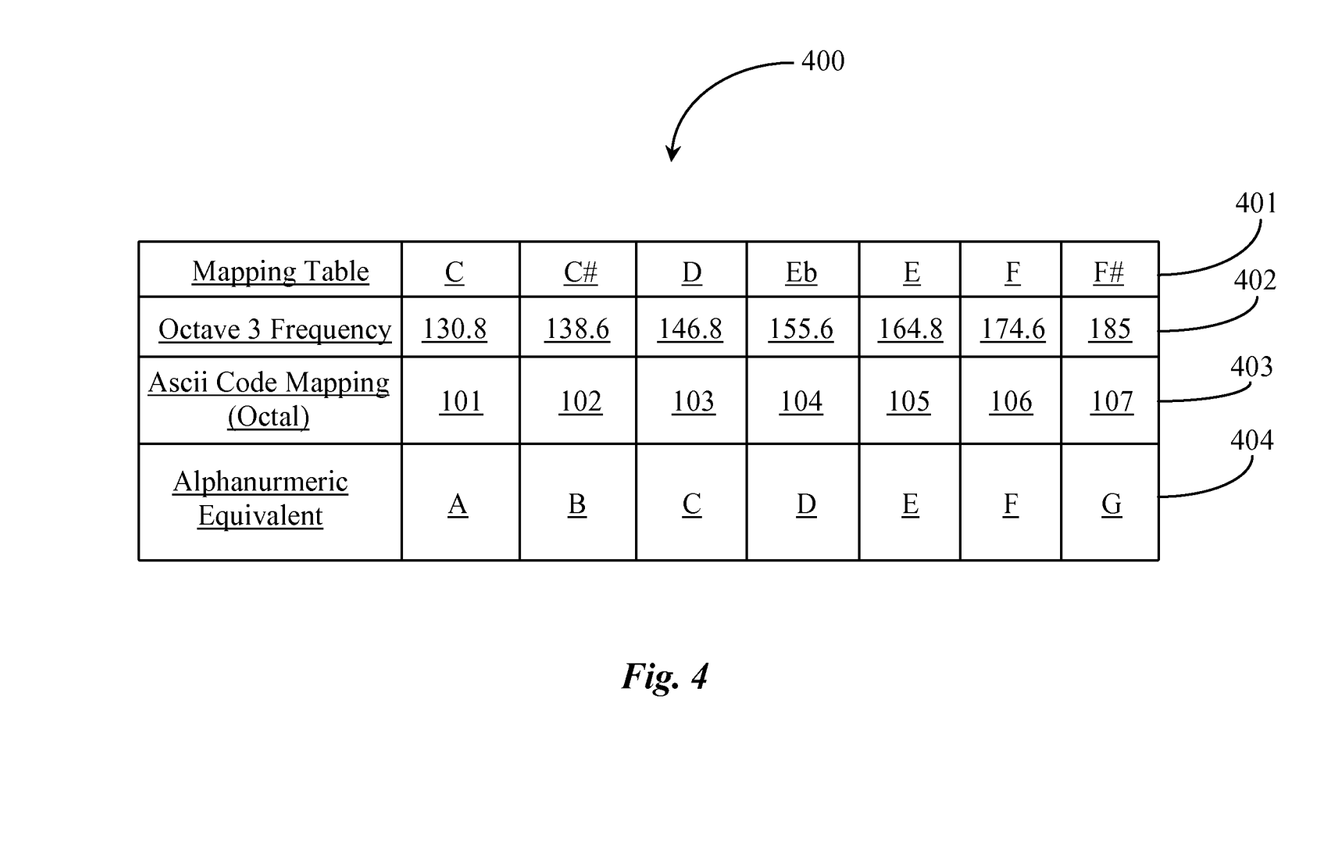
FIG. 4 is a frequency to ASCII code table useful for converting specific frequency sequences to ASCII code for initiating communication according to an embodiment of the present invention.

FIG. 4 is a plan view of frequency to ASCII code table 400 useful for converting specific frequency sequences to ASCII code for initiating communication according to an embodiment of the present invention. In one aspect code frequencies are converted locally on the receiving appliance to an equivalent functionID or even an ASCII code. In this way service option menus can be generated from the code tone sequences alone. Table 400 represents a frequency/ASCII cross-reference mapping table that might be part of SW 105a and 105b downloaded in FIG. 1.

Table 400 includes a row 401 listing notes. Row 402 lists the octave 3 or third octave frequencies for the notes in column format. A row 403 lists the ASCII code mapping for the frequencies also in column format. Row 404 lists optional alphanumeric equivalents to the listed ASCII values. Reading in column format, the note C has a third octave frequency of 130.8 hz and is mapped to ASCII value 101, which also has an alphanumeric equivalent of A. If a functionID is alphanumerically speaking CAB, for example, then the code tone sequence would have to be D, C, and C# at frequencies 146.8 followed by 130.8 followed by 138.6. In this way functionality may be generated on the handheld appliance without the requirement for downloading any information from a server. In one embodiment, code is assembled from the frequencies received in sequence by a code compiler that is part of the downloaded SW application running on the handheld appliance.

Figure 5:
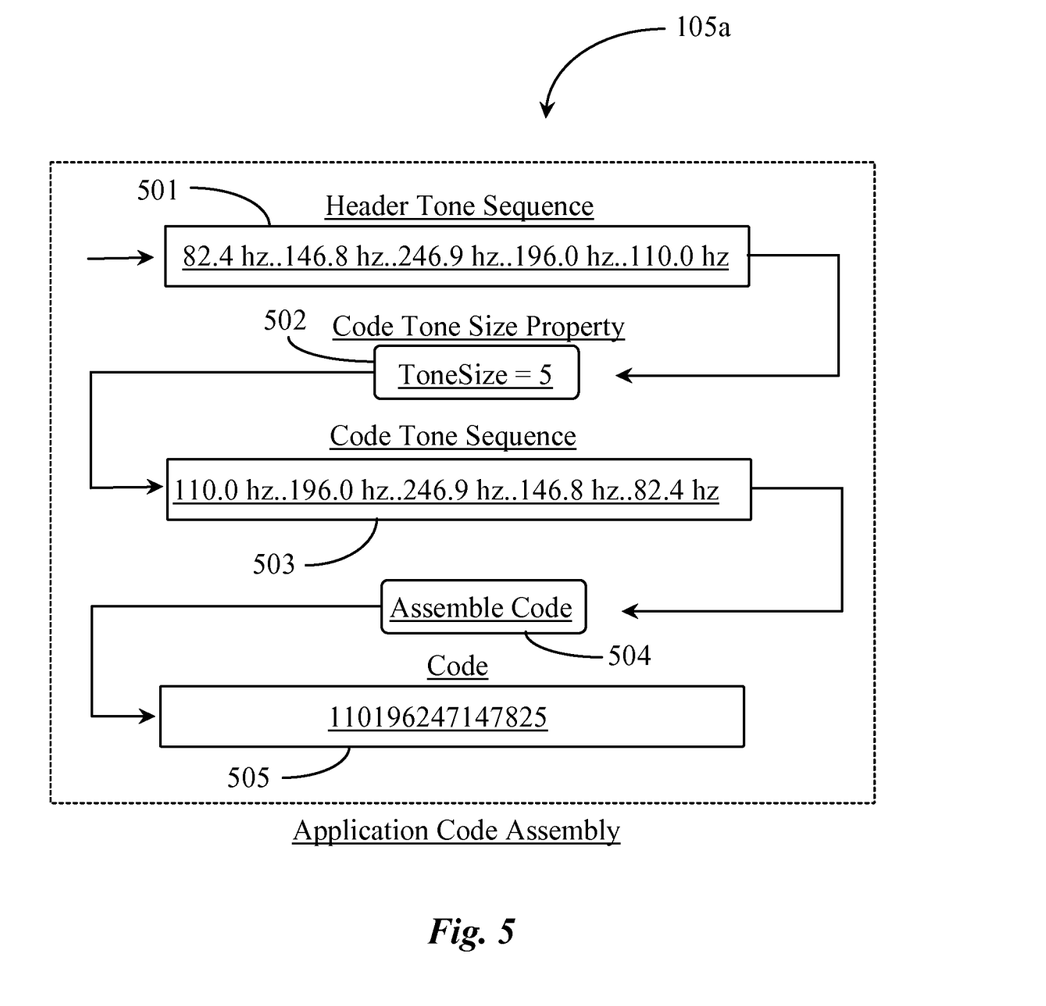
FIG. 5 is a block diagram illustrating code assembly from a code tone sequence using the SW application of FIG. 1 according to an embodiment of the present invention.

FIG. 5 is a block diagram illustrating code assembly from a code tone sequence using the SW application of FIG. 1 according to an embodiment of the present invention. SW 105a may, in one embodiment, be capable of assembling UPC like code from a sequence of tones (frequencies) received. In this example, the handheld appliance receives a header tone sequence 501 with application 105a set to "listen". Header tone sequence 501 contains five different frequencies in sequence beginning with 82.4 hz followed by 146.8 hz, 246.9 hz, 199.0 hz and ending with 110.0 hz.

In this particular example, it may be that the code tone sequence illustrated herein as code tone sequence 503 that invokes function on the handheld appliance is the header tone sequence in the reverse order. In this example, the SW observes a code tone size parameter or property of five tones. Therefore the SW listens for an additional five tones after recognizing the header tone. Code tone sequence 503 is received and the SW stops listening after the fifth tone is received.

An assembly process 504 is then invoked to "assemble" the code. In this example, assembling the code from the received frequencies involves rounding each frequency up to express the frequency in three digits and then concatenating the frequencies into a single string revealing the code 505 that invokes functionality on the handheld appliance. It will be apparent to one with skill in the art that there are numerous different ways that incoming frequencies can be mapped to or assembled into code that can be used to invoke an action on the receiving appliance.

It is not strictly necessary that the header tone described above by a precursor to functionality enabled by code and/or date stored in a data repository at the handheld appliance or retrieved from, for example, from a web-site or other remote node. In some cases the tone may have a first header that alerts the appliance that the balance of the coded information directly enables a function. For example, the balance of the tone may cause the handheld appliance to dial a number or initiate an email to a specific address.

In one embodiment the invention may provide special functions for hearing-impaired persons. If hearing impaired people attend a presentation, a class, watch a video, etc. and there isn't a closed captioning system available, but the presenter or video has a link where the transcript is available in real time (or ready before the speech begins), then a tone can be played and a visual signal can be flashed to tell the hearing impaired person that there is data available for the presentation. Then the transcript can be viewed on the handheld device or the menu can be presented to the hearing impaired person so they can select which functions they need. This could also apply to sight-impaired people. The tone plays, the sight-impaired person gets the data onto the handheld and then audio descriptions of what they are viewing can be dictated to the sight-impaired person.

It will be apparent to one with skill in the art that the communication system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:
1. A communication appliance comprising:
a processor; and
a memory coupled to the processor, wherein the memory has stored thereon instructions that, when executed by the processor, causes the processor to:

receive audio signals over an audible frequency, at least one of the audio signals comprising an audio tone embedded therein, wherein the audio tone comprises a header tone;

compare the header tone of the audio tone with that of one or more header tones stored in a data store for at least a partial match, the data store being accessible by the processor;

in response to identifying at least the partial match, monitor for a subsequent sequence of audio tones comprising a code tone sequence;

in response to identifying the subsequent sequence of audio tones, convert the code tone sequence based on frequencies and durations of the code tone sequence to a resulting code, wherein the memory has further stored thereon a table for converting the code tone sequence to ASCII code useable for generating a specific menu on the communication appliance;

execute the resulting code; and initiate an action on the communication appliance in response to executing the resulting code.

2. The communication appliance of claim 1, wherein the audio signals are emitted by a digital appliance capable of audio output.

3. The communication appliance of claim 1, wherein the action comprises navigating to an Internet server for downloading an interactive menu.

4. The communication appliance of claim 1, wherein the action comprises initiating a telephone call.

5. The communication appliance of claim 1, wherein the converting of the code tone sequence comprises converting the code tone sequence to a unified product code (UPC).

6. The communication appliance of claim 1, wherein a frequency of the audio tone is outside the human range of hearing.

7. The communication appliance of claim 1, wherein the instructions further cause the processor to receive the audio signals via a microphone coupled to the processor.

8. The communication appliance of claim 1, wherein the instructions further cause the processor to receive the audio signals via a network interface coupled to the processor.

9. A method for initiating an action from a communication appliance comprising a processor in response to audio signals, the method comprising:

receiving, by the processor, the audio signals over an audible frequency, at least one of the audio signals comprising an audio tone embedded therein, wherein the audio tone comprises a header tone;

comparing, by the processor, the header tone of the audio tone with that of one or more header tones stored in a data store for at least a partial match, the data store being accessible by the processor;

in response to identifying at least the partial match, monitoring, by the processor, for a subsequent sequence of audio tones comprising a code tone sequence;

in response to identifying the subsequent sequence of audio tones, converting, by the processor, the code tone sequence based on frequencies and durations of the code tone sequence to a resulting code, wherein the converting of the code tone sequence comprises converting the code tone sequence to ASCII code useable for generating, by the processor, a specific menu on the communication appliance;

executing, by the processor, the resulting code from the code tone sequence; and initiating, by the processor, an action on the communication appliance in response to executing the resulting code.

10. The method of claim 9, wherein the audio signals are emitted by a digital appliance capable of audio output.

11. The method of claim 9, wherein the action comprises navigating to an Internet server to download an interactive menu.

12. The method of claim 9, wherein the action comprises initiating a telephone call.

13. The method of claim 9, wherein the converting of the code tone sequence comprises converting the code tone sequence to a unified product code (UPC).

14. The method of claim 9, wherein a frequency of the audio tone is outside the human range of hearing.

15. The method of claim 9, wherein the audio signals are received by the processor via a microphone coupled to the processor.

16. The method of claim 9, wherein the audio signals are received by the processor via a network interface coupled to the processor.

* * * * *